United States Patent
Tamura et al.

(10) Patent No.: US 11,801,799 B2
(45) Date of Patent: Oct. 31, 2023

(54) BUMPER ABSORBER

(71) Applicants: KANEKA CORPORATION, Osaka (JP); Chugai Co., Ltd., Aichi (JP); TOYOTA JIDOSHA KABUSHIKI KAISHA, Aichi (JP); SUBARU CORPORATION, Tokyo (JP)

(72) Inventors: Mitsuhiro Tamura, Tokyo (JP); Seiji Sawai, Tokyo (JP); Yusuke Kikuchi, Aichi (JP); Yuuki Nakamura, Aichi (JP); Shota Kotake, Toyota (JP); Yoshikazu Yukimoto, Anjo (JP)

(73) Assignees: KANEKA CORPORATION, Osaka (JP); Chugai Co., Ltd., Aichi (JP); TOYOTA JIDOSHA KABUSHIKI KAISHA, Aichi (JP); SUBARU CORPORATION, Tokyo (JP)

( * ) Notice: Subject to any disclaimer, the term of this patent is extended or adjusted under 35 U.S.C. 154(b) by 15 days.

(21) Appl. No.: 17/550,139

(22) Filed: Dec. 14, 2021

(65) Prior Publication Data

US 2022/0185212 A1 Jun. 16, 2022

(30) Foreign Application Priority Data

Dec. 16, 2020 (JP) ................................ 2020-208666

(51) Int. Cl.
*B60R 19/18* (2006.01)
*B60R 19/22* (2006.01)

(52) U.S. Cl.
CPC .............. *B60R 19/18* (2013.01); *B60R 19/22* (2013.01); *B60R 2019/1873* (2013.01)

(58) Field of Classification Search
CPC ....... B60R 19/02; B60R 19/023; B60R 19/18; B60R 19/22; B60R 2019/1866
(Continued)

(56) References Cited

U.S. PATENT DOCUMENTS

| | | | |
|---|---|---|---|
| 7,201,412 B2 * | 4/2007 | Kashiwagi | B60R 19/18 293/121 |
| 7,946,636 B2 * | 5/2011 | Goda | B60R 19/18 293/120 |
| 8,517,454 B1 | 8/2013 | Huber et al. | |

(Continued)

FOREIGN PATENT DOCUMENTS

| | | | | |
|---|---|---|---|---|
| EP | 2078642 A1 | 7/2009 | | |
| EP | 2982547 A1 * | 2/2016 | ........... | B60R 19/023 |

(Continued)

OTHER PUBLICATIONS

Extended European Search Report issued in corresponding European Application No. 21214176.6, dated May 11, 2022 (7 pages).

(Continued)

*Primary Examiner* — Jason S Daniels
(74) *Attorney, Agent, or Firm* — Osha Bergman Watanabe & Burton LLP

(57) ABSTRACT

In order to absorb collision energy so as to prevent an increase in reaction force against a pedestrian to a level higher than or equal to a certain level during collision, a bumper absorber of the present invention includes: a trunk part that extends in an X direction and that is simply compressed in the X direction in response to an impact; and a branch part that branches off from the trunk part toward a rear of a vehicle body, the branch part having a branching part in which the branch part branches off from the trunk part and which is provided with a breakage inducing part that causes breakage between the trunk part and the branch part in response to the impact.

9 Claims, 3 Drawing Sheets

(58) Field of Classification Search
USPC .......................................... 293/109, 120, 121
See application file for complete search history.

(56) References Cited

U.S. PATENT DOCUMENTS

| | | | |
|---|---|---|---|
| 10,618,487 B2* | 4/2020 | Syvertsen | B60R 21/0136 |
| 2006/0028037 A1* | 2/2006 | Kashiwagi | B60R 19/18 |
| | | | 293/120 |
| 2006/0131899 A1 | 6/2006 | Adachi et al. | |
| 2007/0114803 A1* | 5/2007 | Takahashi | B60R 21/0136 |
| | | | 293/102 |
| 2007/0187959 A1 | 8/2007 | Adachi et al. | |
| 2010/0102581 A1 | 4/2010 | Goda et al. | |
| 2016/0039376 A1* | 2/2016 | Narita | B60R 19/18 |
| | | | 293/4 |
| 2016/0257271 A1 | 9/2016 | Tomita | |

FOREIGN PATENT DOCUMENTS

| | | |
|---|---|---|
| JP | 2004175338 A | 6/2004 |
| JP | 2006160015 A | 6/2006 |
| JP | 2008-094262 A | 4/2008 |
| JP | 2008-189250 A | 8/2008 |
| JP | 2015-003688 A | 1/2015 |
| JP | 2016022940 A | 2/2016 |
| JP | 2016159855 A | 9/2016 |
| JP | 2019172101 A | 10/2019 |

OTHER PUBLICATIONS

Office Action issued in corresponding Japanese Application No. 2020-208666; dated Nov. 22, 2022 (5 pages).

* cited by examiner

BUMPER ABSORBER

This Nonprovisional application claims priority under 35 U.S.C. § 119 on Patent Application No. 2020-208666 filed in Japan on Dec. 16, 2020, the entire contents of which are hereby incorporated by reference.

TECHNICAL FIELD

The present invention relates to a bumper absorber.

BACKGROUND ART

A bumper system is conventionally provided at the front and the rear of a vehicle body of a vehicle such as an automobile so that the vehicle body will be protected and an occupant or a collided object will be less damaged during collision. In particular, there has recently been developed a bumper system that is capable of reducing an injury level of a pedestrian involved in an automobile accident by reducing a load acting on a leg of the pedestrian.

Such a bumper system has an impact absorbing structure. In the impact absorbing structure, an impact absorbing member (bumper absorber) is disposed on a front surface of a bumper reinforcement that is provided so as to extend in a vehicle width direction.

Bumper absorbers in various shapes have been proposed. For example, Patent Literature 1 discloses a bumper absorber that extends in a front-to-rear direction of a vehicle and that has (i) a lower leg which has a flat plate shape and is substantially horizontally disposed, (ii) an upper leg which has a flat plate shape and is provided above the lower leg, and (iii) a side part which connects the front of the lower leg and the front of the upper leg.

A bumper absorber disclosed in Patent Literature 2 includes a first shock absorbing member and a second shock absorbing member that are formed so as to be vertically divided. The first shock absorbing member and the second shock absorbing member are integrally coupled to each other at a front position. Meanwhile, the first shock absorbing member and the second shock absorbing member define a space therebetween at a rear position. A connection between the first shock absorbing member and the second shock absorbing member is configured to be capable of being broken in response to an impact of a collision object from a front side.

CITATION LIST

Patent Literatures

[Patent Literature 1]
Japanese Patent Application Publication Tokukai No. 2015-3688
[Patent Literature 2]
Japanese Patent Application Publication Tokukai No. 2008-94262

SUMMARY OF INVENTION

Technical Problem

The bumper absorbers that are disclosed in Patent Literatures 1 and 2 and are made of foam each absorb collision energy by compression of the foam during the collision. However, in a case where the foam is compressed at a level higher than or equal to a certain level, the bumper absorbers may be incapable of absorbing the collision energy, and, consequently, may strongly react against a pedestrian. Thus, from the viewpoint of pedestrian protection, conventional bumper absorbers still have room for improvement in terms of how to absorb energy so as to prevent an increase in reaction force to a level higher than or equal to a certain level.

An object of an aspect of the present invention is to provide a bumper absorber capable of reducing a reaction force against a pedestrian during collision.

Solution to Problem

In order to achieve the object, a bumper absorber in accordance with an aspect of the present invention is a bumper absorber provided in a bumper system inside a vehicle body, the bumper absorber including: a trunk part that has a flat plate shape, that extends in a front-to-rear direction of the vehicle body, and that is simply compressed in the front-to-rear direction in response to an impact of a collision object; and at least one branch part that has a flat plate shape and that branches off from the trunk part toward a rear of the vehicle body, the branch part having a branching part in which the branch part branches off from the trunk part and which is provided with a breakage inducing part that causes breakage between the trunk part and the branch part in response to the impact.

Advantageous Effects of Invention

According to the aspect of the present invention, it is possible to reduce a reaction force against a pedestrian during collision.

Figure 4:
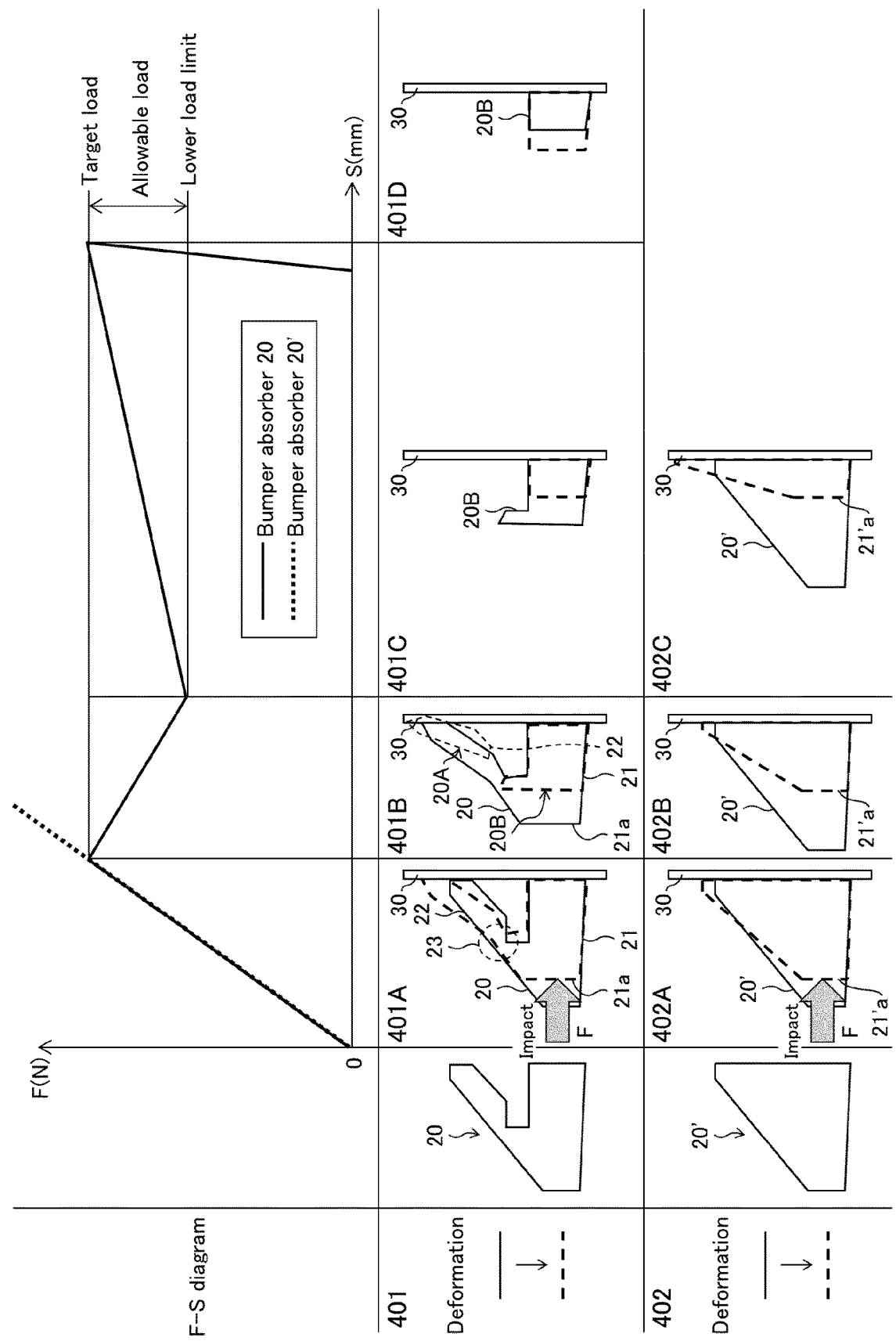

401 (401A to 401D) of FIG. 4 illustrates impact absorbing action of the bumper absorber in accordance with an embodiment of the present invention. 402 (402A to 402C) of FIG. 4 illustrates impact absorbing action of a bumper absorber serving as a Comparative Example. An F-S diagram of FIG. 4 shows a relationship between a load acting on a collision object and a displacement, the relationship being observed under the impact absorbing action of each of the bumper absorber in accordance with an embodiment of the present invention and the Comparative Example.

DESCRIPTION OF EMBODIMENTS

Figure 1:
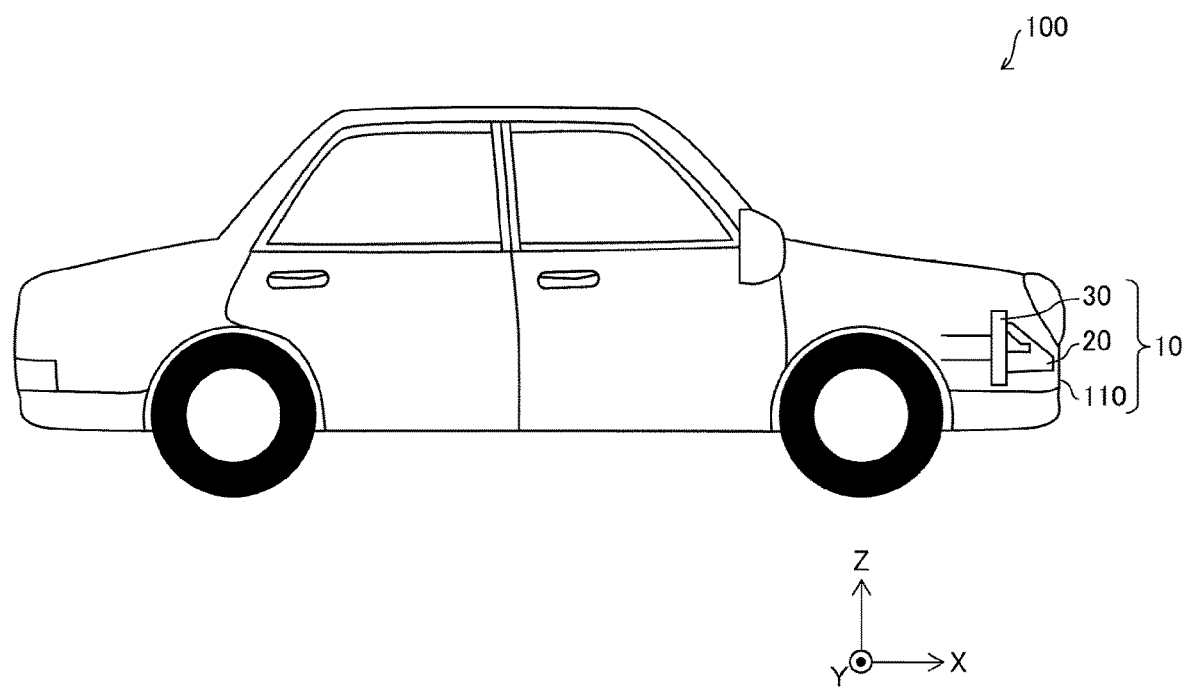
FIG. 1 is a perspective view schematically illustrating a configuration of a vehicle including a bumper system having a bumper absorber in accordance with an embodiment of the present invention.

The following description will discuss an embodiment of the present invention, but the present invention is not limited to the embodiment. The present invention is not limited to any of configurations described below, but can be altered within the scope of the claims. FIG. 1 is a perspective view schematically illustrating a configuration of a vehicle 100 including a bumper system 10 having a bumper absorber 20 in accordance with the present embodiment. It is herein assumed that an X direction is a direction extending from the rear to the front of the vehicle 100, a Y direction is a vehicle width direction of the vehicle 100, and a Z direction is a direction perpendicular to both the X direction and the Y direction. The Z direction can also be described as a direction extending from a lower side to an upper side of the vehicle 100.

As illustrated in FIG. 1, the bumper system 10 includes the bumper absorber 20, a bumper reinforcement 30, and a bumper fascia 110. The bumper reinforcement 30 is mounted to a vehicle body of the vehicle 100. The bumper absorber 20 is provided so as to be in contact with a front surface of the bumper reinforcement 30. The bumper fascia 110 is an exterior member of the vehicle 100 and covers the bumper absorber 20 and the bumper reinforcement 30.

The bumper absorber 20 has a function of absorbing collision energy by being deformed or crushed between a collided object (e.g., a leg of a pedestrian) and the bumper reinforcement 30 during a collision accident. In particular, the bumper absorber 20 has a function of reducing a reaction force against the collided object. The bumper absorber 20 is made of a highly impact absorbent material.

The bumper reinforcement 30 is made of steel and is a member horizontally extending in the Y direction. The bumper reinforcement 30 receives the bumper absorber 20 which is compressively deformed. For example, the bumper reinforcement 30 has a hollow tubular structure having a substantially rectangular parallelepiped external shape. In such a hollow tubular structure, the bumper reinforcement 30 can include a partition wall for reinforcement provided in a hollow tube. Furthermore, the bumper reinforcement 30 functions as (i) a mounting seat for the bumper absorber 20 and (ii) a base that works when the bumper absorber 20 is crushed and absorbs an impact.

The bumper fascia 110 is a member with which the bumper absorber 20 and the bumper reinforcement 30 are covered from the outside of the vehicle body. The bumper fascia 110 allows the vehicle body of the vehicle 100 to have a better design quality. Furthermore, the bumper fascia 110 has a function of protecting the bumper absorber 20 from an external environment so as to prevent a deterioration in performance of the bumper absorber 20.

The bumper fascia 110 is preferably deformed or broken by a relatively small load when an impact load is applied thereto. This allows the impact load to be easily transmitted to the bumper absorber 20, so that the bumper fascia 110 can be prevented from inhibiting impact absorbing performance of the bumper absorber 20. Thus, the bumper fascia 110 is, preferably, for example, a thin-walled molded product that is formed by injection molding or press molding of synthetic resin or the like.

Figure 2:
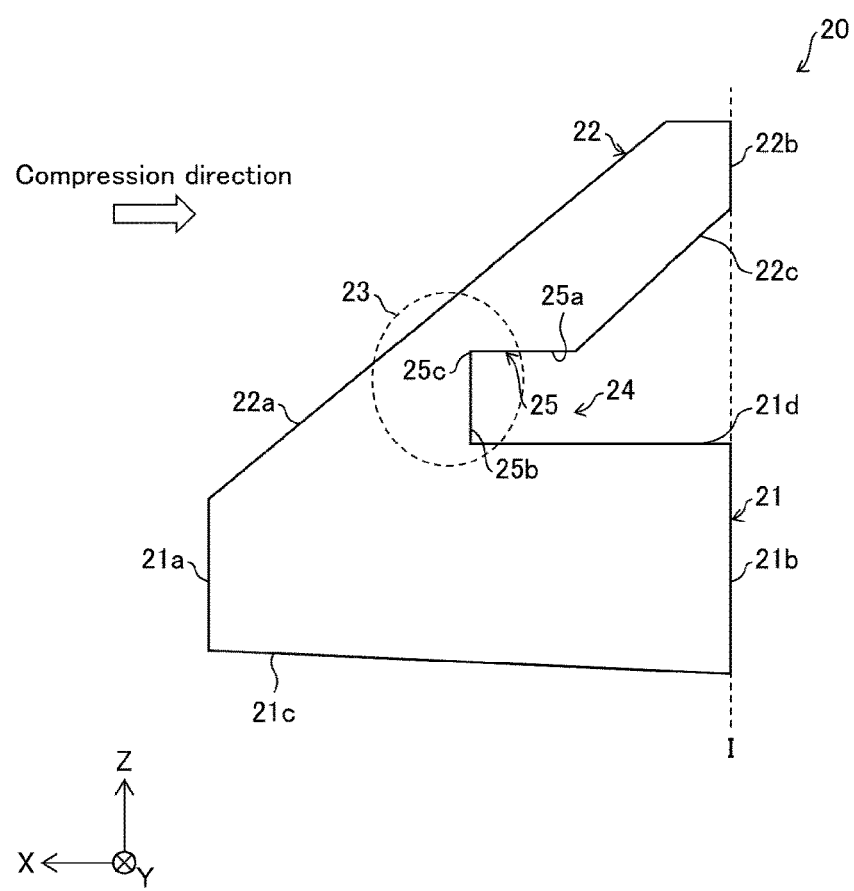
FIG. 2 is a cross-sectional view schematically illustrating a configuration of the bumper absorber in accordance with an embodiment of the present invention.

Next, a configuration of the bumper absorber 20 will be described in more detail. FIG. 2 is a cross-sectional view schematically illustrating the configuration of the bumper absorber 20.

The bumper absorber 20 extends in the Y direction (vehicle width direction) and has a length that is close to the width of the vehicle 100. The bumper absorber 20 has an X-direction cross-sectional shape that is substantially uniform in the Y direction. As illustrated in FIG. 2, the bumper absorber 20 has a trunk part 21 and a branch part 22.

The trunk part 21 is in the shape of a flat plate extending in the Y direction and extends in the front-to-rear direction of the vehicle body, i.e., the X direction. The trunk part 21 has a front surface 21a, a rear surface 21b, a lower surface 21c, and an upper surface 21d. The front surface 21a functions as a collision surface that receives a collision from a collision object during a collision accident. The front surface 21a is located at the foremost position in the bumper absorber 20 as a whole. The rear surface 21b is in contact with the bumper reinforcement 30 (described earlier). The lower surface 21c is connected to both the front surface 21a and the rear surface 21b. The lower surface 21c is a surface that inclines upward from the rear to the front. The upper surface 21d is a surface of the trunk part 21 which surface faces the branch part 22.

The trunk part 21 has a shape that causes the trunk part 21 to be simply compressed in the front-to-rear direction (i.e., the X direction) when the front surface 21a is subjected to collision with the collision object. The expression "simply compressed" means that the trunk part 21 is compressed in the X direction in response to collision of the collision object without any change in orientation of the front surface 21a and of the rear surface 21b.

The trunk part 21 which is subjected to the collision with the collision object is simply compressed without being inverted or overturned. In this case, the trunk part 21 is compressed so that the front surface 21a approaches a contact position I (corresponding to a position of the rear surface 21b) at which the bumper reinforcement 30 (described earlier) and bumper absorber 20 are in contact with each other. Assume here that a direction in which the front surface 21a approaches the contact position I is a compression direction. The compression direction can also be described as a direction extending from the front to the rear, that is, a −X direction.

The branch part 22 is in the shape of a flat plate extending in the Y direction and branches off from the trunk part 21 toward the rear of the vehicle body. More specifically, the branch part 22 branches off from the trunk part 21 in a front part of the trunk part 21 while inclining upward from the front to the rear. The branch part 22 has a front inclined surface 22a, a rear surface 22b, and an inner surface 22c. The front inclined surface 22a is connected to the front surface 21a. The front inclined surface 22a is a surface that extends from a part thereof connected to the front surface 21a and that inclines upward from the front to the rear. The rear surface 22b is in contact with the bumper reinforcement 30 (described earlier). The rear surface 21b and the rear surface 22b are provided at substantially the same position in the X direction. The inner surface 22c is a surface of the branch part 22 which surface faces the trunk part 21.

Furthermore, the bumper absorber 20 includes a breakage inducing part 24 that is provided in a branching part 23 of the branch part 22 in which branching part 23 the branch part 22 branches off from the trunk part 21. The breakage inducing part 24 has a function of causing breakage between the trunk part 21 and the branch part 22 in response to an impact. The breakage inducing part 24 causes the bumper absorber 20 that is subjected to the impact on the front surface 21a to cause the branch part 22 to be broken and separated from the trunk part 21 that is being simply compressed. Thus, according to the bumper absorber 20, during a process in which the bumper absorber 20 is subjected to an impact of the collision object and absorbs collision energy, the breakage inducing part 24 causes the branch part 22 to be broken and separated from the trunk part 21, and only the trunk part 21 is subjected to the impact after the branch part 22 is thus broken.

The breakage inducing part 24 is not particularly limited provided that the breakage inducing part 24 has a structure that causes breakage between the trunk part 21 and the branch part 22 in response to the impact. In order to cause breakage between the trunk part 21 and the branch part 22 by a simpler structure, the breakage inducing part 24 is preferably provided in a space defined by the trunk part 21 and the branch part 22.

For example, as illustrated in FIG. 2, the breakage inducing part 24 is a groove 25. The groove 25 extends in the Y direction. The groove 25 is a groove that is recessed in the branching part 23 in a direction opposite to the compression direction of the trunk part 21. The expression "groove recessed in a direction opposite to the compression direction" herein refers to a groove that is recessed in a direction opposite to the compression direction with respect to the branch part 22.

The groove 25 is defined by a surface 25a, a surface 25b, and the upper surface 21d of the trunk part 21. The surface 25a is a surface that extends to the front inclined surface 22a side with respect to the inner surface 22c of the branch part 22. The surface 25b is a surface that constitutes a front end surface of the surfaces defining the groove 25 and that connects the upper surface 21d of the trunk part 21 and the surface 25a. When viewed in the Y direction, the surface 25a and the surface 25b constitute an inverted L-shaped wall surface.

This inverted L-shaped wall surface part has a function of causing breakage between the trunk part 21 and the branch part 22. Application of an impact load to the front surface 21a of the bumper absorber 20 causes the trunk part 21 and the branch part 22 to be compressively deformed in the −X direction. Then, progression of such compressive deformation results in concentration of stress at a connection 25c between the surface 25a and the surface 25b in the inverted L-shaped wall surface part. The bumper absorber 20 that is further compressively deformed finally causes breakage between the trunk part 21 and the branch part 22, so that the branch part 22 is spaced from the trunk part 21.

Figure 3:
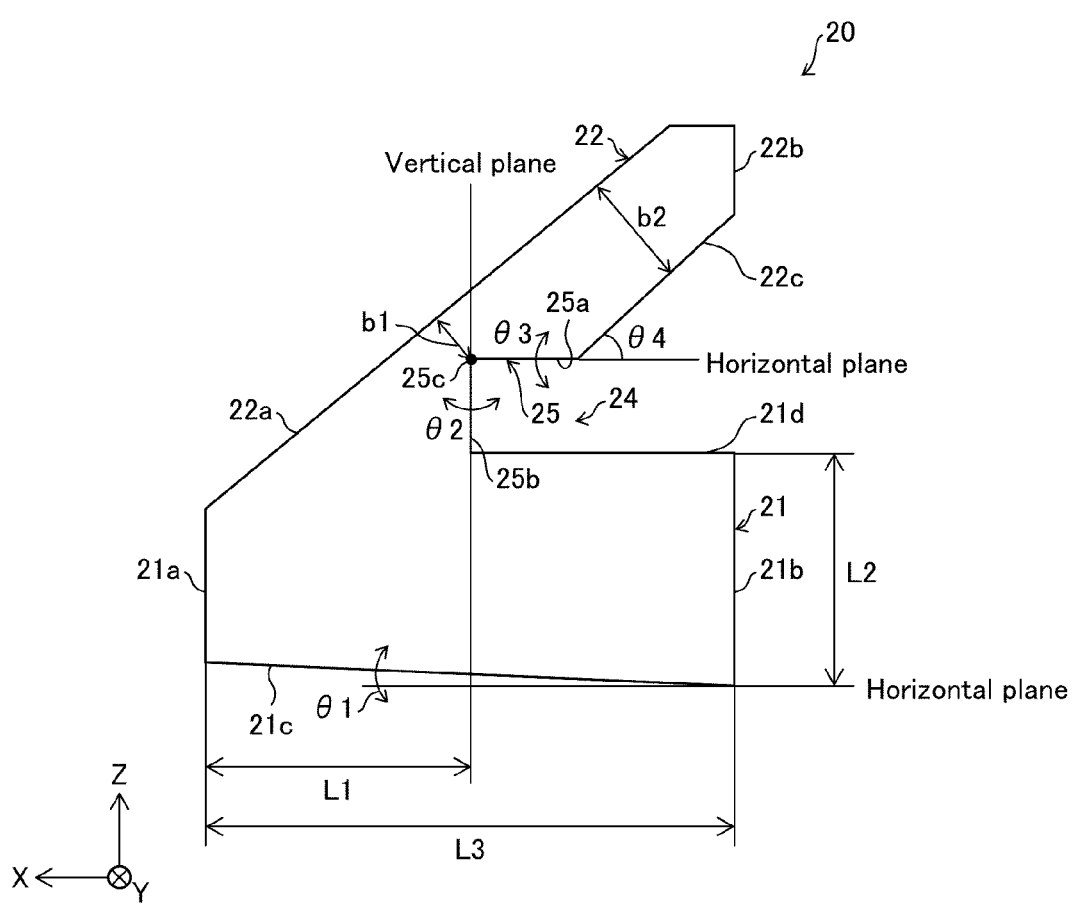
FIG. 3 is a cross-sectional view for explaining dimensions defining the bumper absorber in accordance with an embodiment of the present invention.

Next, dimensions that define the bumper absorber 20 will be described. FIG. 3 is a cross-sectional view for explaining a preferred example of the dimensions that define the bumper absorber 20. It should be noted that the bumper absorber in accordance with an embodiment of the present invention is not limited to, for example, those dimensions.

First, the lower surface 21c of the trunk part 21 can have an inclination angle θ1 that is set in a range of 0°≤θ1≤5° with respect to a horizontal plane. A length L1, a height L2 of the trunk part 21, and a length L3 can be set, as appropriate, in accordance with an allowable load of the bumper absorber 20. It should be noted that the length L1 is a length in the X direction between the front surface 21a and the surface 25b and that the length L3 is a length in the X direction between the front surface 21a and the rear surface 21b.

The length L1 is in a range of preferably 10% to 90%, and more preferably 30% to 60% of the length L3. The length L1 that is in the above range brings about an effect of impact absorption caused by deformation and breakage in the branch part.

The surfaces 25a and 25b of the groove 25, which surfaces constitute the inverted L-shaped wall surface, can have respective inclination angles that are set as below. Specifically, the surface 25a can have an inclination angle θ3 that is set in a range of 0°≤θ3<90° with respect to the horizontal plane. The surface 25b can have an inclination angle θ2 that is set in a range of −75°≤θ2<90° with respect to a vertical plane.

The branch part 22 can have an inclination angle θ4 that is set in a range of 0°<θ4≤75° with respect to the horizontal plane. Note that the inclination angle θ4 is specifically an inclination angle of the inner surface 22c of the branch part 22 with respect to the horizontal plane.

The branch part 22 has a first part in which the groove 25 is provided and which has a thickness b1 that is smaller than a thickness b2 of a second part of the branch part in which second part no groove 25 is provided. Specifically, the thickness b1 is defined as a length between (a) the front inclined surface 22a of the branch part 22 and (b) the connection 25c between the surface 25a and the surface 25b in the groove 25. The thickness b2 is defined as a length between the front inclined surface 22a and the inner surface 22c of the branch part 22. The thickness b1, which is thus smaller than the thickness b2, can cause breakage between the trunk part 21 and the branch part 22.

Next, impact absorbing action of the bumper absorber 20 will be described in more detail. 401 (401A to 401D) of FIG. 4 are views illustrating impact absorbing action of the bumper absorber 20 in accordance with the present embodiment. 402 (402A to 402C) of FIG. 4 are views illustrating impact absorbing action of a bumper absorber 20' of a Comparative Example. Furthermore, an F-S diagram of FIG. 4 is a graph showing a relationship between a load F (hereinafter may also be referred to as an "impact F") acting on a collision object and a displacement S, the relationship being observed under the impact absorbing action of each of the bumper absorber 20 and the bumper absorber 20'. In the F-S diagram of FIG. 4, an F-S curve of the bumper absorber 20 is shown by a solid line, and an F-S curve of the bumper absorber 20' is shown by a dotted line. As used herein, the expression "load acting on a collision object" refers to a value obtained by multiplying, by a mass of a collision object, acceleration (deceleration) acting on the collision object during a collision accident or the like. The expression may also be simply referred to as a "load". The load can also be described as a reaction force.

401A to 401D of FIG. 4 are provided in correspondence with the displacement S of the bumper absorber 20 in the F-S diagram. Similarly, 402A to 402C of FIG. 4 are provided in correspondence with the displacement S of the bumper absorber 20' in the F-S diagram.

As compared with the bumper absorber 20, the bumper absorber 20' is configured such that a space defined between the trunk part 21 and the branch part 22 is filled with a material (see 402 of FIG. 4). That is, the bumper absorber 20' has a shape of a pentagonal prism having a substantially trapezoidal base surface and extending in the Y direction.

The bumper absorber 20 that is subjected to an impact of a collision object from the front changes in shape as illustrated in 401A to 401D of FIG. 4, so that the impact (impact load) F can be softened. As illustrated in 401A of FIG. 4, application of the impact F to the front surface 21a by the collision object (not illustrated) causes the bumper absorber 20 to be compressed in the front-to-rear direction while the trunk part 21 and the branch part 22 are vertically apart from each other. In this case, the front surface of the bumper reinforcement 30 is in contact with both the trunk part 21 and the branch part 22. The bumper absorber 20, which is compressed while both the trunk part 21 and the branch part 22 thus receive the impact F, causes an increase in load in an initial stage of the impact.

Then, further application of the impact F causes the breakage inducing part 24 to induce breakage. This causes the bumper absorber 20 to be broken in the branching part 23 of the branch part 22 in which branching part 23 the branch part 22 branches off from the trunk part 21, so that the bumper absorber 20 is separated into a broken piece 20A and a broken piece 20B. In this case, the collision object is gradually subjected to a greater load F, and the load F reaches a load peak (target load) when the bumper absorber 20 is separated into the broken pieces 20A and 20B (see the F-S diagram). Note that the broken piece 20A includes the branch part 22 and that the broken piece 20B includes the trunk part 21.

After the bumper absorber 20 is separated into the broken pieces 20A and 20B, the impact F is transmitted to the broken piece 20B, which includes the trunk part 21, but is not transmitted to the broken piece 20A, which includes the branch part 22. As a result, after the bumper absorber 20 is separated into the broken pieces 20A and 20B, only the broken piece 20B, which includes the trunk part 21, receives the impact F and is compressed. Then, a stronger impact is applied to the broken piece 20B, so that the front surface 21a moves relatively backward and absorbs the impact F. In this case, the collision object is subjected to the load that is decreased to a lower load limit.

Next, as illustrated in 401C of FIG. 4, only the broken piece 20B receives the impact F. Then, the broken piece 20B is compressively deformed while absorbing the impact F, and is compressed in an allowable load range. Then, as illustrated in 401D of FIG. 4, only the broken piece 20B, which includes the trunk part 21, reacts against the impact F. This makes it is possible to reduce reaction against the impact. Thus, the collision object is subjected to the load that reaches the target load with a gradual increase without being lower than the lower load limit, so that the impact F is softened.

As compared with the bumper absorber 20, the bumper absorber 20' softens the impact (impact load) F by changing in shape as illustrated in 402A to 402C of FIG. 4. As illustrated in 402A to 402C of FIG. 4, the bumper absorber 20' receives the impact F through a front surface 21'a and absorbs the impact F merely by being compressively deformed. Thus, as shown by the dotted line in the F-S diagram, the collision object is subjected to the load that exceeds the target load.

As described earlier, the bumper absorber 20 in accordance with the present embodiment allows the collision object to be subjected to the load that is in the allowable load range ranging from the lower load limit to the target load. That is, the bumper absorber 20 brings about an effect of absorbing collision energy so as to prevent an increase in reaction force (load) against a pedestrian to a level higher than or equal to a certain level during collision. According to the bumper absorber 20, the target load and the lower load limit that are suitable for a vehicle can be set by designing, as appropriate, the length L1, the height L2 of the trunk part 21, and the length L3, which are specified in FIG. 3.

The bumper absorber 20 illustrated in, for example, FIG. 1 is configured such that a single branch part 22 is provided to a single trunk part 21. However, the bumper absorber in accordance with the present embodiment only needs be configured to be provided with at least one branch part and can have a configuration that is not limited to the configuration illustrated in FIG. 1, provided that the bumper absorber can bring about the effect (described earlier). For example, the bumper absorber in accordance with the present embodiment can be alternatively configured in FIG. 1 such that a plurality of branch parts 22 are provided to a single trunk part 21.

Furthermore, the bumper absorber 20 can be made of a material that is not particularly limited. At least the trunk part 21 of the bumper absorber 20 preferably only needs to be made of resin foam. The branch part 22, which is broken and separated in response to an impact from the front, can be made of a material that is different from or identical to the material of which the trunk part 21 is made. The branch part 22 that is made of the material different from the material of which the trunk part 21 is made is preferably made of a flexible material that is compressed in response to an impact from the front.

In a case where the trunk part 21 and the branch part 22 are made of a single resin foam, the bumper absorber 20 is preferably constituted by a molded product into which the trunk part 21 and the branch part 22 are integrally molded.

A base material resin of the resin foam is not particularly limited, but is preferably a foamable thermoplastic resin. The thermoplastic resin is preferably at least one resin selected from the group consisting of a polystyrene-based resin, a polyolefin-based resin, and a polyester-based resin.

Examples of the polystyrene-based resin include a resin that has a structural unit derived from a styrene-based monomer. Preferred examples of the styrene-based monomer include styrene, methylstyrene, ethylstyrene, isopropylstyrene, dimethylstyrene, bromostyrene, chlorostyrene, vinyltoluene, and vinylxylene. Examples of the resin that has a structural unit derived from a styrene-based monomer include (a) homopolymers of styrene-based monomers, the homopolymers being obtained by polymerizing styrene-based monomers of one kind, and (b) copolymers of styrene-based monomers, the copolymers being obtained by polymerizing styrene-based monomers of two or more kinds. It is possible to preferably use a polystyrene-based resin, which is any of homopolymers of styrene-based monomers and copolymers of styrene-based monomers, i.e., a resin that has only a structural unit derived from a styrene-based monomer.

Examples of the polyester-based resin include aliphatic polyester resins, aromatic polyester resins, and aliphatic-aromatic polyester resins. Specific examples of the polyester-based resin include polyhydroxyalkanoates, polybutylene succinate (PBS), poly(butylene adipate-co-terephthalate) (PBAT), and polyethylene terephthalate (PET). Furthermore, examples of the polyhydroxyalkanoates include at least one kind selected from the group consisting of poly(3-hydroxybutyrate-co-3-hydroxyhexanoate) (PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxyoctadecanoate).

The polyolefin-based resin is not particularly limited, and examples thereof include polypropylene-based resins and polyethylene-based resins. Specific examples of a monomer of the polyolefin-based resin (hereinafter may also be referred to as an "olefin-based monomer") include α-olefins having 2 to 12 carbon atoms, such as ethylene, propylene, butene-1, isobutene, pentene-1, 3-methyl-butene-1, hexene-1, 4-methyl-pentene-1, 3,4-dimethyl-butene-1, heptene-1, 3-methyl-hexene-1, octene-1, and decene-1. These monomers can be used alone, or two or more of these monomers can be used in combination.

Examples of other monomer(s) copolymerizable with the olefin-based monomer include: cyclic olefins such as cyclopentene, norbornene, and 1,4,5,8-dimethano-1,2,3,4,4a,8,8a,6-octahydronaphthalene; and dienes such as 5-methylene-2-norbornene, 5-ethylidene-2-norbornene, 1,4-hexadiene, methyl-1,4-hexadiene, and 7-methyl-1,6-ooctadiene. These monomers can be used alone, or two or more of these monomers can be used in combination.

Specific examples of the polyolefin-based resin include: (i) polyethylene-based resins each containing ethylene as a main component, such as high-density polyethylene, intermediate-density polyethylene, low-density polyethylene, and linear low-density polyethylene; and (ii) polypropylene-based resins each containing polypropylene as a main component. These polyolefin-based resins can be used alone, or two or more of these polyolefin-based resins can be used in combination.

Among these polyolefin-based resins, any of the polyethylene-based resins each containing ethylene as a main component is particularly effective in the bumper absorber in accordance with the present embodiment. In particular, a polypropylene-based resin containing ethylene, which is an α-olefin, as a copolymerizable monomer component is easily available and is easily processable or moldable.

The polypropylene-based resins are not particularly limited provided that the polypropylene-based resins each contain propylene as a main component of the monomer. Examples of the polypropylene-based resins include a propylene homopolymer, an α-olefin-propylene random copolymer, and an α-olefin-propylene block copolymer. These polypropylene-based resins can be used alone, or two or more of these polypropylene-based resins can be used in combination.

Examples of a blowing agent that can be used include volatile hydrocarbon-based blowing agents such as propane, isobutane, butane, pentane, and hexane; inorganic gases such as air, nitrogen, and carbon dioxide; and water. An inorganic gas that is used as the blowing agent is preferably carbon dioxide because carbon dioxide makes it possible to easily obtain expanded particles expanded at a relatively high expanding ratio. These blowing agents can be used alone, or two or more of these blowing agents can be used in combination.

Aspects of the present invention can also be expressed as follows:

A bumper absorber 20 in accordance with Aspect 1 of the present invention is a bumper absorber 20 provided in a bumper system 10 inside a vehicle body, the bumper absorber 20 including: a trunk part 21 that has a flat plate shape, that extends in a front-to-rear direction (X direction) of the vehicle body, and that is simply compressed in the front-to-rear direction in response to an impact F (shock) of a collision object; and at least one branch part 22 that has a flat plate shape and that branches off from the trunk part 21 toward a rear of the vehicle body, the branch part 22 having a branching part 23 in which the branch part 22 branches off from the trunk part 21 and which is provided with a breakage inducing part 24 that causes breakage between the trunk part 21 and the branch part 22 in response to the impact F.

The bumper absorber 20 in accordance with Aspect 2 of the present invention is configured such that, in Aspect 1, the breakage inducing part 24 is provided on a side of a space defined by the trunk part 21 and the branch part 22.

The bumper absorber 20 in accordance with Aspect 3 of the present invention is configured such that, in Aspect 1 or 2, the breakage inducing part 24 is a groove 25 that is recessed in the branching part 23 in a direction opposite to a direction in which the trunk part 21 is compressed.

The bumper absorber 20 in accordance with Aspect 4 of the present invention is configured such that, in any one of Aspects 1 to 3, at least the trunk part 21 is made of resin foam.

The bumper absorber 20 in accordance with Aspect 5 of the present invention is configured such that, in any one of Aspects 1 to 4, the trunk part 21 has a lower surface 21c that has an inclination angle $\theta 1$ in a range of $0° \leq \theta 1 \leq 5°$ with respect to a horizontal plane.

The bumper absorber 20 in accordance with Aspect 6 of the present invention is configured such that, in any one of Aspects 1 to 5, the branch part 22 has an inclination angle $\theta 4$ in a range of $0° < \theta 4 \leq 75°$ with respect to a horizontal plane.

The present invention is not limited to the embodiments, but can be altered by a person skilled in the art within the scope of the claims. An embodiment derived from a proper combination of technical means each disclosed in a different embodiment is also encompassed in the technical scope of the present invention.

REFERENCE SIGNS LIST

10 Bumper system
20 Bumper absorber
21 Trunk part
22 Branch part
23 Branching part
24 Breakage inducing part
100 Vehicle

The invention claimed is:

1. A bumper absorber provided in a bumper system inside a vehicle body, the bumper absorber comprising:
   a trunk part that has a rear surface that is flat, that extends in a front-to-rear direction of the vehicle body, and that is simply compressed in the front-to-rear direction in response to an impact of a collision object; and
   at least one branch part that has a rear surface that is flat and that branches off from the trunk part toward a rear of the vehicle body,
   wherein the branch part has a branching part in which the branch part branches off from the trunk part and which is provided with a breakage inducing part that causes breakage between the trunk part and the branch part in response to the impact,
   wherein the rear surface of the trunk part is configured to be in contact with a bumper reinforcement.

2. The bumper absorber as set forth in claim 1, wherein the breakage inducing part is provided on a side of a space defined by the trunk part and the branch part.

3. The bumper absorber as set forth in claim 1, wherein the breakage inducing part is a groove that is recessed in the branching part in a direction opposite to a direction in which the trunk part is compressed.

4. The bumper absorber as set forth in claim 1, wherein at least the trunk part is made of resin foam.

5. The bumper absorber as set forth in claim 1, wherein the trunk part has a lower surface that has an inclination angle $\theta 1$ in a range of $0° \leq \theta 1 \leq 5°$ with respect to a horizontal plane.

6. The bumper absorber as set forth in claim 1, wherein the branch part has an inclination angle $\theta 4$ in a range of $0° < \theta 4 \leq 75°$ with respect to a horizontal plane.

7. The bumper absorber as set forth in claim 1, wherein the rear surface of the trunk part and the rear surface of the at least one branch part are provided at a same position in an X-direction.

8. The bumper absorber as set forth in claim 1, wherein the trunk part extends in the front-to-rear direction of the vehicle body, and is simply compressed in the front-to-rear direction in response to the impact of the collision object without being inverted or overturned.

9. The bumper absorber as set forth in claim 1, wherein the bumper absorber that is subjected to the impact on a front surface causes the at least one branch part to be broken and separated from the trunk part that is simply compressed.

* * * * *